US009725951B2

(12) United States Patent
Slupik et al.

(10) Patent No.: US 9,725,951 B2
(45) Date of Patent: Aug. 8, 2017

(54) MOTORIZED SYSTEM WITH POSITION CALIBRATION, CIRCUIT PROTECTION AND DETECTION OF MOTOR STOPPAGE

(71) Applicant: Silvair Sp. z o.o., Cracow (PL)

(72) Inventors: Szymon Slupik, Cracow (PL); Maciej Witalinski, Jaworzno (PL); Adam Gembala, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 0 days.

(21) Appl. No.: 14/666,285

(22) Filed: Mar. 23, 2015

(65) Prior Publication Data

US 2015/0376943 A1    Dec. 31, 2015

Related U.S. Application Data

(60) Provisional application No. 62/018,136, filed on Jun. 27, 2014.

(51) Int. Cl.
    *E06B 9/68*      (2006.01)
    *G05D 3/10*      (2006.01)
    (Continued)

(52) U.S. Cl.
    CPC .............. *E06B 9/68* (2013.01); *G05D 3/10* (2013.01); *H02P 23/24* (2016.02); *H02P 25/04* (2013.01); *E06B 2009/6809* (2013.01)

(58) Field of Classification Search
    CPC .............. E06B 9/68; H02P 23/24; G05D 3/10
    (Continued)

(56) References Cited

U.S. PATENT DOCUMENTS

| 4,941,063 A | 7/1990 | McCartney et al. |
| 6,215,265 B1 * | 4/2001 | Wolfer ............ E06B 9/72 160/310 |

(Continued)

FOREIGN PATENT DOCUMENTS

| CN | 201601488 U | 10/2010 |
| EP | 1918506 A2 | 5/2008 |
| KR | 20020053330 A | 7/2002 |

OTHER PUBLICATIONS

"Partial International Search / Invitation to Pay Addititional Search Fees", issued in International Application PCT/US2015/038133 on Nov. 21, 2015, Publisher: EPO as International Searching Authority.

(Continued)

*Primary Examiner* — Erick Glass
(74) *Attorney, Agent, or Firm* — McGeary Cukor LLC; Kenneth Ottesen; Jason Paul DeMont

(57) ABSTRACT

A motorized system that allows for calibration by a user, and that features circuit protection and detection of motor stoppage. A motorized window-blind system is an example of such a system and is disclosed herein. In particular, a circuit is featured that comprises a TRIAC, or "triode for alternating current," and TVS diodes, or "transient-voltage-suppression diodes," providing voltage protection to various types of motor-related electronic components. A controller is disclosed that features measurement of voltage that is induced on a secondary winding of a motor, in order to detect certain events that occur during the operation of the motor. A calibration method is also disclosed that can account for one or both of the protection circuit and event-detecting controller. The calibration method accounts for human interaction and, in doing so, is intended toward making a calibration process of a motorized household system less prone to human error.

19 Claims, 13 Drawing Sheets

(51) Int. Cl.
*H02P 25/04* (2006.01)
*H02P 23/24* (2016.01)

(58) Field of Classification Search
USPC .......................................... 318/626
See application file for complete search history.

(56) References Cited

U.S. PATENT DOCUMENTS

| | | |
|---|---|---|
| 2005/0074252 A1 | 4/2005 | Hirst et al. |
| 2005/0237692 A1 | 10/2005 | Grehant |
| 2006/0033460 A1* | 2/2006 | D'ayot .................... E06B 9/68 |
| | | 318/280 |
| 2006/0132072 A1 | 6/2006 | D'Ayot |
| 2008/0191658 A1 | 8/2008 | Bruno |

OTHER PUBLICATIONS

Auth. Officer: Jacinta Molloy, "International Search Report and Written Opinion", dated Mar. 15, 2016 issued in related International Application No. PCT/US2015/038133.
Authorized Officer: Agnes Wittmann-Regis, "International Preliminary Report on Patentability" issued in counterpart PCT application No. PCT/US2015/038133, dated Dec. 27, 2016, Publisher: PCT.

* cited by examiner

MOTORIZED SYSTEM WITH POSITION CALIBRATION, CIRCUIT PROTECTION AND DETECTION OF MOTOR STOPPAGE

CROSS REFERENCE TO RELATED APPLICATIONS

The following application is incorporated by reference: U.S. Patent Application Ser. No. 62/018,136, filed Jun. 27, 2014. If there are any contradictions or inconsistencies in language between the present application and the application incorporated by reference that might affect the interpretation of the claims in the present application, the claims herein should be interpreted to be consistent with the language herein.

FIELD OF THE INVENTION

The present invention relates to motorized systems in general, and, more particularly, to a motorized window-blind system with position calibration, circuit protection, and detection of motor stoppage.

BACKGROUND OF THE INVENTION

Many household devices and appliances enable a user ahead of time to configure them to operate in a customized manner. For example, a smart-switch device can be programmed to control a first light based on one combination of button pushes and a nearby, second light based on another combination. As another example, a coffeemaker appliance can be programmed to make automatically coffee at 7:00 am on some mornings and 9:00 am on others.

The configuring of some such devices and appliances can be clumsy, however. Some smart switches, for instance, only enable programming by having the user tap in various sequences on the switch itself. Yet, this clumsiness in programming has been addressed somewhat. A software application, or "app", running on a Bluetooth-enabled or WiFi-enabled smartphone can provide a keyboard on the phone display; the smartphone user configures the device or appliance by using the keyboard, and the app translates these user interactions into commands that are transmitted wirelessly to the device or appliance.

The aforementioned combination of smartphone, app, and wireless capability has addressed some of the configuring problems and for some types of appliances, but not all. Some appliances require a training procedure such as calibration, including appliances that comprise one or more electromechanical systems such as a motor. In such appliances, the motor might need to be calibrated by operating it across at least one complete cycle of operation. One such application of a motor is in a motorized window blind, which uses a motor to raise and lower the blind, where moving the blind from being fully opened to fully closed to fully opened again constitutes one complete cycle. Calibration on such a device might be necessary in order to determine how to select an intermediate position for the blind, instead of merely allowing the blind to move to its extreme positions—that is, up or down all the way. Another reason for calibration is to support a progress bar when the blind is being moved from one position to another, even from one extreme position to the other.

In regard to calibrating a motorized blind or similar system, a user is typically prompted to press a button that controls the motor in a first direction, whereupon the blind travels from one extreme to the other extreme. Then, the user releases the button when the blind has stopped travelling, when prompted to do so. The user is then prompted to press a button controlling the motor in the opposite direction and is prompted to release the button when the blind has travelled back to its original position.

Various difficulties still exist with calibration, however. A first problem with the aforementioned calibration procedure is that it is often perceived as inconvenient to the user. Although the procedure might seem straightforward, it still involves a human user, which inherently makes the calibration process prone to error.

In addition, the controllers of such motorized systems comprise electronics that can be damaged if the driving motor is not carefully turned on, turned off, or reversed in direction. For example, some motorized window blinds are conventionally driven with a motor that has a double winding and is powered by alternating current (AC) line voltage, or "mains" voltage. The two windings in the motor respectively drive upward motion and downward motion in the window blind. The motor has built-in limit switches that cut off power when the blind reaches the top or bottom position. When the blind is raised and reaches the topmost position, the winding that powers the upward movement is cut off. Similarly, when the blind is lowered and reaches the bottommost position, the winding that powers the downward movement is cut off. Although the limit switches perform these important functions, they can also introduce problems in the controlling circuitry.

Finally, some of the costs associated the controllers of some prior-art motorized systems are excessive and need to be lowered in order to promote additional acceptance by the consumer of such systems.

SUMMARY OF THE INVENTION

The present invention enables a motorized system with improved calibration, circuit protection, and detection of motor stoppage than in some motorized systems in the prior art. The improvements that are disclosed herein can be applied to a motorized window-blind system, which is featured in this specification, as well as to other motorized systems, within households and elsewhere.

In accordance with the illustrative embodiment of the present invention, a power-switching circuit is disclosed that addresses the problem of certain electronic components being subjected to voltage spikes when the driving motor is turned on, turned off, or reversed in direction. The circuit is disclosed herein that comprises a TRIAC, or "triode for alternating current," and TVS diodes, or "transient-voltage-suppression diodes," providing voltage protection to various types of electronic components, including while not being limited to control components of alternating-current (AC) motors.

In accordance with the illustrative embodiment of the present invention, a controller is disclosed that provides a cost advantage over at least some controllers in the prior art, in particular for those of AC motors. The controller disclosed herein features measurement of voltage that is induced on a secondary winding of a motor, in contrast to or in addition to measuring electrical current that is present at a primary winding of the motor. The controller measures the voltage in order to detect certain events that occur during the operation of the motor, including while not being limited to motor stoppage.

A calibration method disclosed herein of a motorized system, illustratively a motorized window blind, can account for one or both of the aforementioned protection circuit and event-detecting controller. The disclosed calibration method accounts for human interaction and, in doing so, is intended toward making a calibration process of a motorized household system less prone to human error.

An illustrative control system comprises: a first terminal of a controller, the first terminal being electrically connectable to a first end of a first winding of a motor having a shaft, wherein voltage being applied via the first terminal to the first end of the first winding in relation to a second end of the first winding results in rotation of the shaft in a first rotation direction; a second terminal of the controller, the second terminal being electrically connectable to a first end of a second winding of the motor, wherein voltage being applied via the second terminal to the first end of the second winding in relation to a second end of the second winding results in rotation of the shaft in a second rotation direction; a third terminal of the controller, the third terminal being electrically connectable to the second end of the first winding and the second end of the second winding; a detector of the controller, the detector being configured to detect a decrease in magnitude of voltage across the second and third terminals when voltage is being applied at the first end of the first winding; and a processor of the controller, the processor being configured to output a first signal based on the detector detecting the decrease across the second and third terminals.

An illustrative method for controlling a motor by a controller, the motor having i) a shaft, ii) a first winding, and iii) a second winding, the controller having i) a first terminal that is electrically connected to a first end of the first winding, ii) a second terminal that is electrically connected to a first end of the second winding, and iii) a third terminal that is electrically connected to a) a second end of the first winding and b) a second end of the second winding, comprises: applying, by the controller, predetermined voltage via the first terminal to the first end of the first winding in relation to the second end of the first winding such that the motor shaft rotates in a first rotation direction; detecting, by the controller, a decrease in magnitude of voltage across the second and third terminals when voltage is being applied at the first end of the first winding; and generating, by the controller, a first signal based on the decrease detected across the second and third terminals.

An illustrative method for calibration comprises: receiving, by a controller, a first command to calibrate a motorized device that is mechanically coupled to a shaft of a motor; actuating the motor, by the controller providing voltage at a first winding of the motor, based on receiving the first command, wherein the actuating is such that the shaft rotates in a first direction moving the motorized device from a first position toward a second position; detecting, by the controller, that the motorized device reaches the second position; actuating the motor, by the controller providing voltage at a second winding of the motor, wherein the actuating is such that the shaft rotates in a second direction moving the motorized device from the second position toward the first position; detecting, by the controller, that the motorized device reaches the first position; transmitting a message based on the detecting of the motorized device reaching the first position.

An illustrative circuit comprises: a first triode for alternating current (TRIAC) having an MT1 terminal, an MT2 terminal, and a gate; a first transient-voltage-suppression (TVS) diode having i) a first terminal electrically coupled to the MT2 terminal of the TRIAC and ii) a second terminal; and a second TVS diode having i) a first terminal electrically coupled to the second terminal of the first TVS diode and ii) a second terminal electrically coupled to the MT1 terminal of the TRIAC; wherein the first TRIAC conducts electrical current if a predetermined voltage across the second TVS diode is exceeded.

DETAILED DESCRIPTION

Figure 1A:
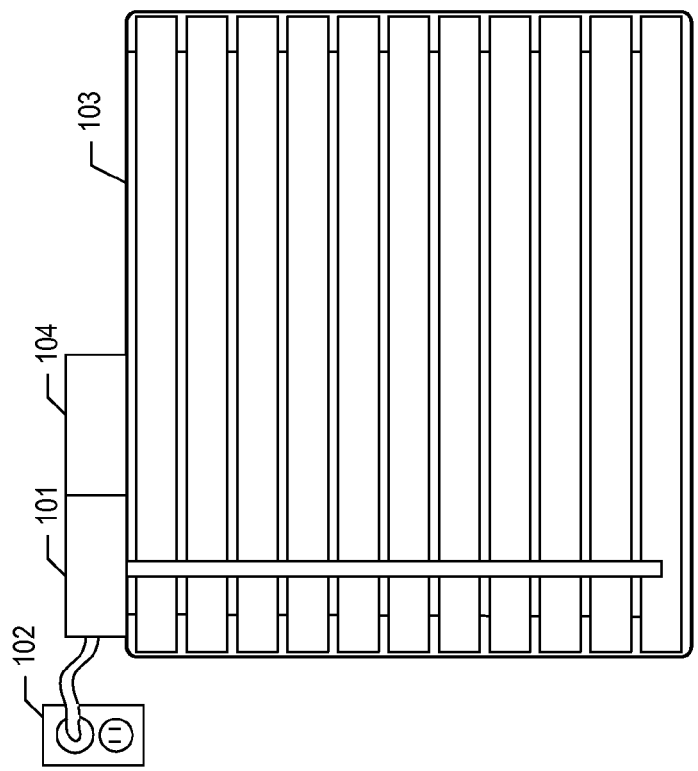
FIGS. 1A and 1B depicts a picture of motorized system 100 in accordance with the illustrative embodiment of the present invention.
Figure 1B:
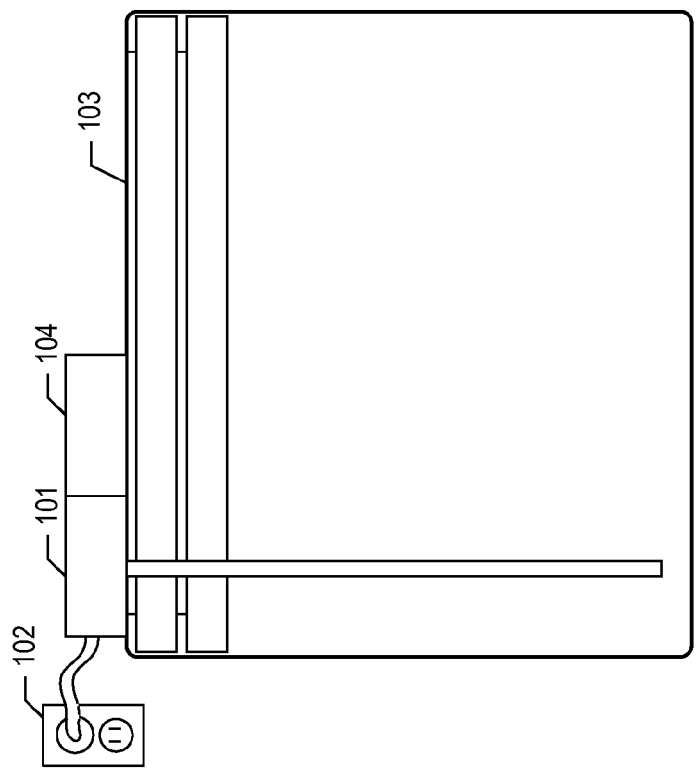

FIGS. 1A and 1B depicts a picture of motorized system 100 in accordance with the illustrative embodiment of the present invention. Motorized household system 100 comprises motor 101, AC power source 102, motorized device 103, and controller 104, interrelated as shown. As depicted, motorized device 103 comprises a window blind that is driven, operated, and controlled by motor 101 and controller 104, and has limits of movement in two directions across one dimension—namely, "up" and "down" across a vertical dimension. It will be clear to those skilled in the art, however, after reading this specification, how to make and use embodiments of the present invention in which a type of motorized appliance, device, or object different from a window blind is driven, operated, and controlled, as well as being governed by limits of movement (e.g., rotational, translational, etc.) in one or more directions across one or more dimensions.

Motor 101 is configured with a double winding and powered by alternating current (AC) line voltage, which is 110 VAC in the United States and 230 VAC in the European Union, for example and without limitation, provided by AC power source 102. The respective two windings drive upward motion and downward motion in window blind 103. Motor 101 has built-in limit switches that cut off electrical power when the blind reaches the top or bottom position. When blind 103 connected to motor 101 is raised and reaches the topmost position, as shown in FIG. 1A, the winding that powers the upward movement is cut off.

Similarly, when the blind is lowered and reaches the bottommost position, as shown in FIG. 1B, the winding that powers the downward movement is cut off.

The motorized window blind can be controlled remotely via a smartphone or by a smart-home management system. These allow the position of the window blind also to be set at an intermediate position anywhere between being fully opened and fully closed. Accordingly, and as described in detail later, controller 104 is configured to communicate with a controlling application on a smartphone or with a smart-home system that executes the movement of the blinds automatically based on built-in rules, scenes, and presets. Commands are exchanged via a wired or wireless digital connection between the controlling application (in the smartphone or system) and controller 104. Moving blind 103 to an intermediate position requires controller 104 to track the movement as a proportionate, percentage distance between the topmost and bottommost limit. In doing so, the controller has to know the time it takes for blind 103 to move from the 0% to 100% position and also the time it takes it to move from the 100% to 0% position; this is because the times can differ, in that upward movement usually takes more time than downward movement, owing to gravity.

Figure 2:
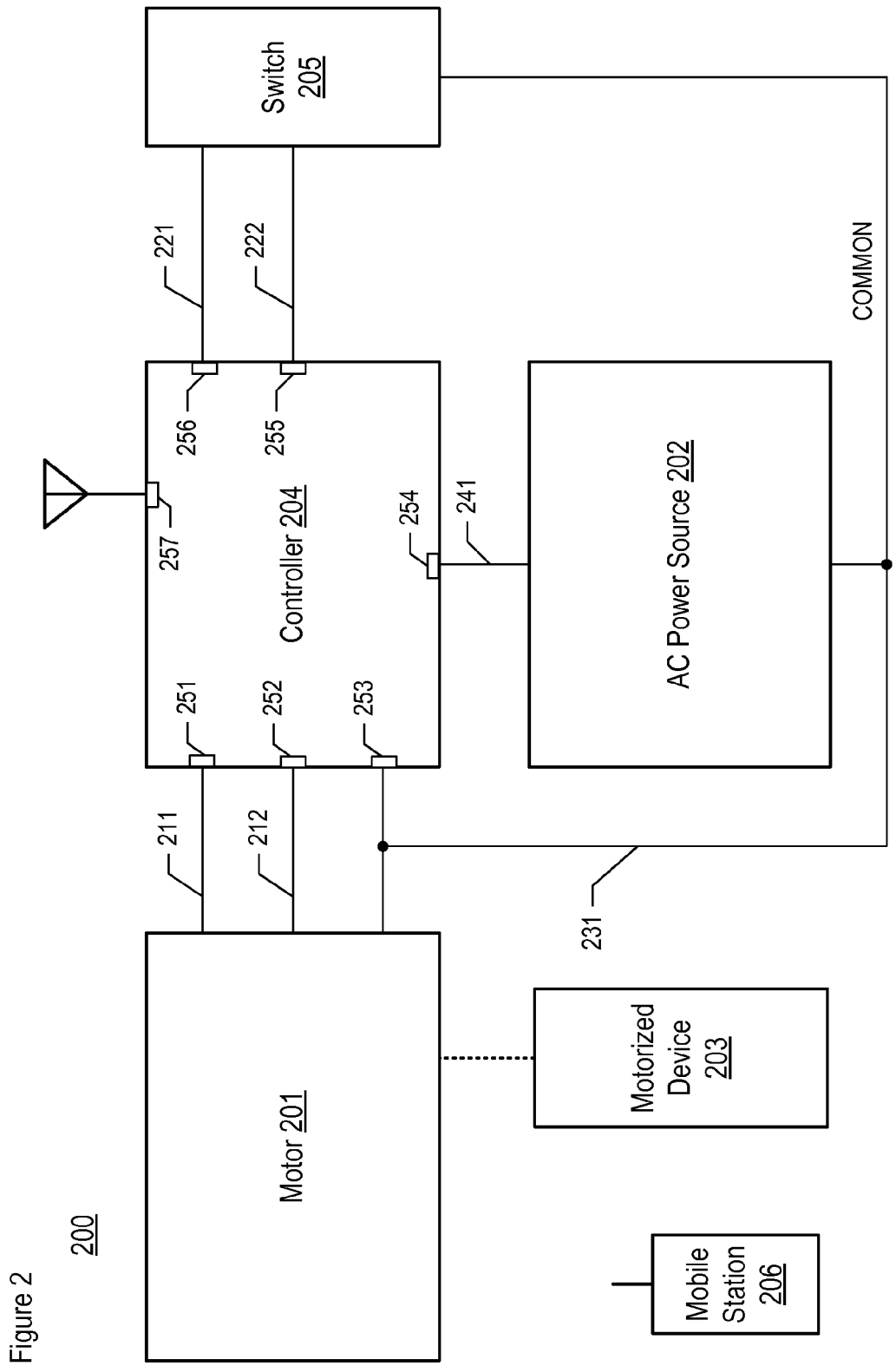
FIG. 2 a schematic diagram of motorized system 200 in accordance with the illustrative embodiment of the present invention.

FIG. 2 a schematic diagram of motorized system 200 in accordance with the illustrative embodiment of the present invention. System 200 comprises motor 201, AC power source 202, motorized device 203, controller 204, switch 205, and mobile station 206, interrelated as shown. Motor 201, corresponding to motor 101 in FIG. 1, is configured with a double winding and powered by alternating current (AC) line voltage, which is provided by AC power source 202 in well-known fashion, which corresponds to power source 102. Motor 201 drives (e.g., moves, rotates, etc.) motorized device 203, which is mechanically coupled to motor 201 in well-known fashion. Device 203, corresponding to device 103, is illustratively a window blind. As those who are skilled in the art will appreciate after reading this specification, however, device 203 can be another type of motorized device or appliance—household or otherwise.

Figure 3:
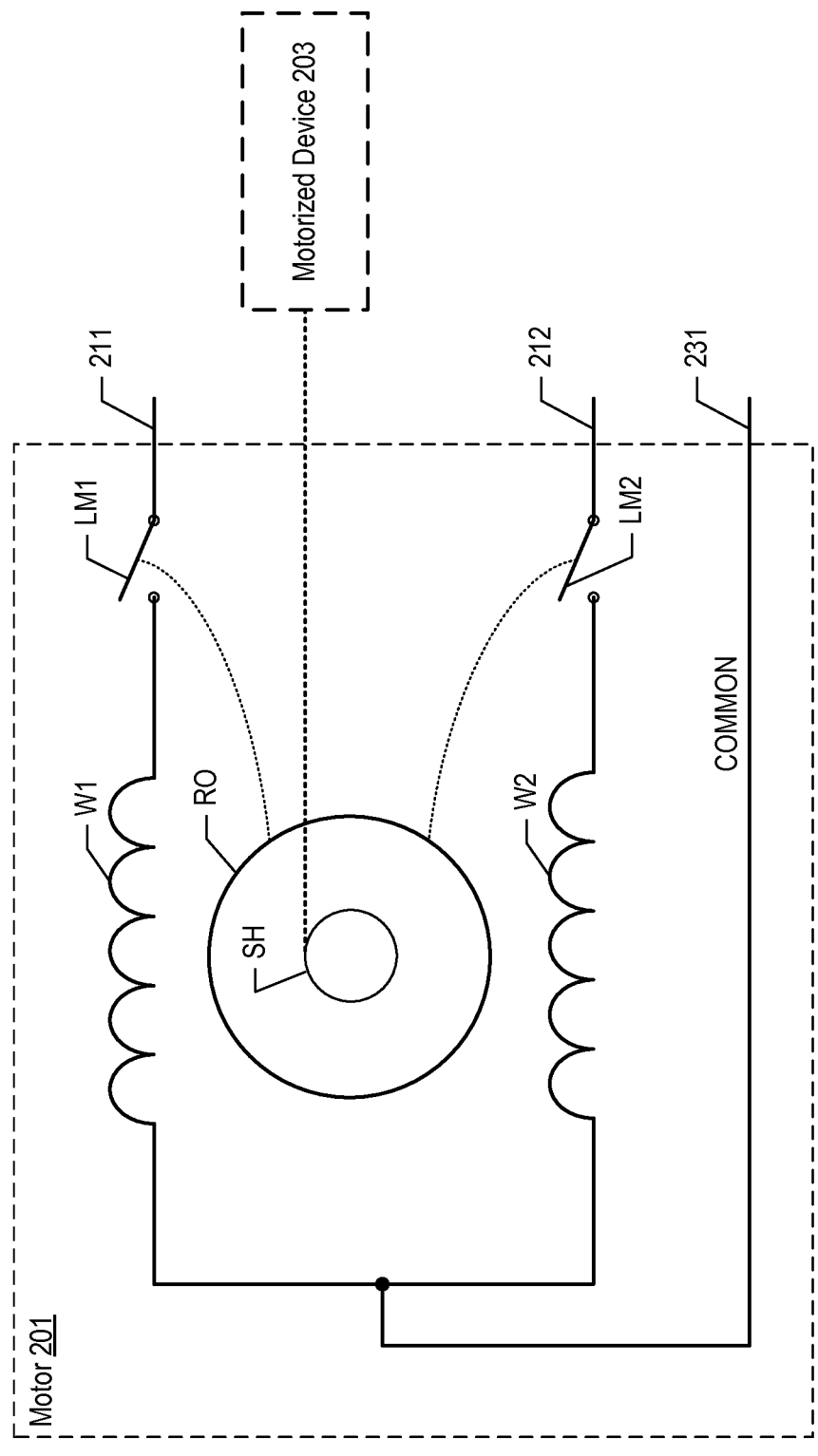
FIG. 3 depicts motor 201 of system 200.

As depicted in FIG. 3, a first winding W1 is energized by voltage that is applied to line 211 relative to neutral line 231, and a second winding W2 is energized by voltage that is applied to line 212 relative to neutral line 231. The two windings drive upward motion and downward motion, respectively, in a motorized device 203. Motor 201 further comprises limit switches, namely LM1 and LM2, which cut off power when the blind reaches the top or bottom position. When a blind that is mechanically coupled to motor 201 via shaft SH is raised and reaches the topmost position, winding W1 that powers the upward movement is cut off by limit switch LM1 when LM1 senses that rotor RO, which is connected to shaft SH, has stopped rotating in a first rotation direction. Similarly, when the blind is lowered and reaches the bottommost position, winding W2 that powers the downward movement is cut off by limit switch LM2 when LM2 senses that rotor RO has stopped rotating in a second rotation direction. Power should never be applied to both winding W1 and W2 at the same time.

Returning now to FIG. 2, controller 204, corresponding to controller 104, is a controller module that is configured to perform various functions, including at least some of the tasks described below and in the accompanying figures, including FIGS. 6 and 9-11. Generally speaking, controller 204 communicates with external devices and systems, such as mobile station 206 or a smart home system, for example and without limitation. Additionally, it controls motor 201, in part as a result of a calibration process and by relying on stored information as described below. Controller 204 also detects the extreme positions in movements of a driven object, such as motorized window blinds, in order to calibrate the motorized device automatically. Controller 204 is described in detail below and in FIG. 4.

As those who are skilled in the art will appreciate after reading this specification, controller 204 can be configured to control movement (e.g., rotational, translational, etc.) in one or more directions across one or more dimensions, and to control a different type and/or a different number of movements of motor 201 and/or device 203 than depicted.

Switch 205 is an optional "local" wired momentary switch. When pressed "up," a contact between line 221 and common line 231 is closed as long as the switch is being depressed, and when pressed "down," a contact between line 222 and common line 231 are closed. The "up" and "down" inputs are considered soft-switch inputs, as they do not switch the current to motor 201. Instead, they are binary switch inputs provided to a microcontroller that is part of controller 204, namely microcontroller unit 401 as described below, wherein the microcontroller decides what actions should be executed. Usually, the actions are "up" and "down" but can also be preset selections or scene selections. Also, the microcontroller can discriminate between "short" and "long" presses. For example and without limitation, a relatively long press (e.g., greater than 10 seconds) of both switches could indicate that an auto-calibration sequence is to be initiated, as described elsewhere in this specification.

Mobile station 206 is a wireless telecommunications terminal that is configured to transmit and/or receive communications wirelessly. It is an apparatus that comprises memory, processing components, telecommunication components, and user interface components (e.g., display, speaker, keyboard, microphone, etc.). Mobile station 206 comprises the hardware and software necessary to be compliant with the protocol standards used in the wireless network or networks in which it operates and to perform or support execution of the processes described below and in the accompanying figures. For example and without limitation, mobile station 206 is capable of:

i. receiving an incoming (i.e., "mobile-terminated") telephone call or other communication (e.g., application-specific data, SMS text, email, media stream, etc.),
  ii. transmitting an outgoing (i.e., "mobile-originated") telephone call or other communication (e.g., application-specific data, SMS text, email, media stream, etc.),
  iii. controlling and monitoring controller 204, and/or
  iv. receiving, transmitting, or otherwise processing one or more signals in support of one or more of capabilities i through iii.

Furthermore, mobile station 206 is illustratively a smartphone with at least packet data capability provided and supported by the network in which it operates and that is configured to execute a software application (e.g., an "app") for controlling one or more controllers 204. In some alternative embodiments of the present invention, mobile station 206 can be referred to by a variety of alternative names such as, while not being limited to, a wireless transmit/receive unit (WTRU), a user equipment (UE), a wireless terminal, a cell phone, or a fixed or mobile subscriber unit. In some alternative embodiments of the present invention, mobile station 206 communicates directly with an intermediate controller (not depicted), which in turn is capable of controlling and monitoring controller 204.

Communication between mobile station 206 and controller 204 is enabled by a wireless network that comprises Bluetooth Low Energy (BLE) network. However, as those who are skilled in the art will appreciate after reading this specification, the wireless network can be based on one or more different types of wireless network technology standards, in addition to or instead of BLE, such as Z-Wave, ZigBee, Wi-Fi, Bluetooth Classic, or Thread, for example and without limitation, in order to enable communication between the mobile station and controller. Furthermore, as those who are skilled in the art will appreciate after reading this specification, mobile station 206 and controller 204 in some embodiments can be connected directly and non-wirelessly to each other, at least for some purposes and/or for some portion of time, such as through Universal Serial Bus (USB), FireWire™, or Thunderbolt™, for example and without limitation.

Figure 4:
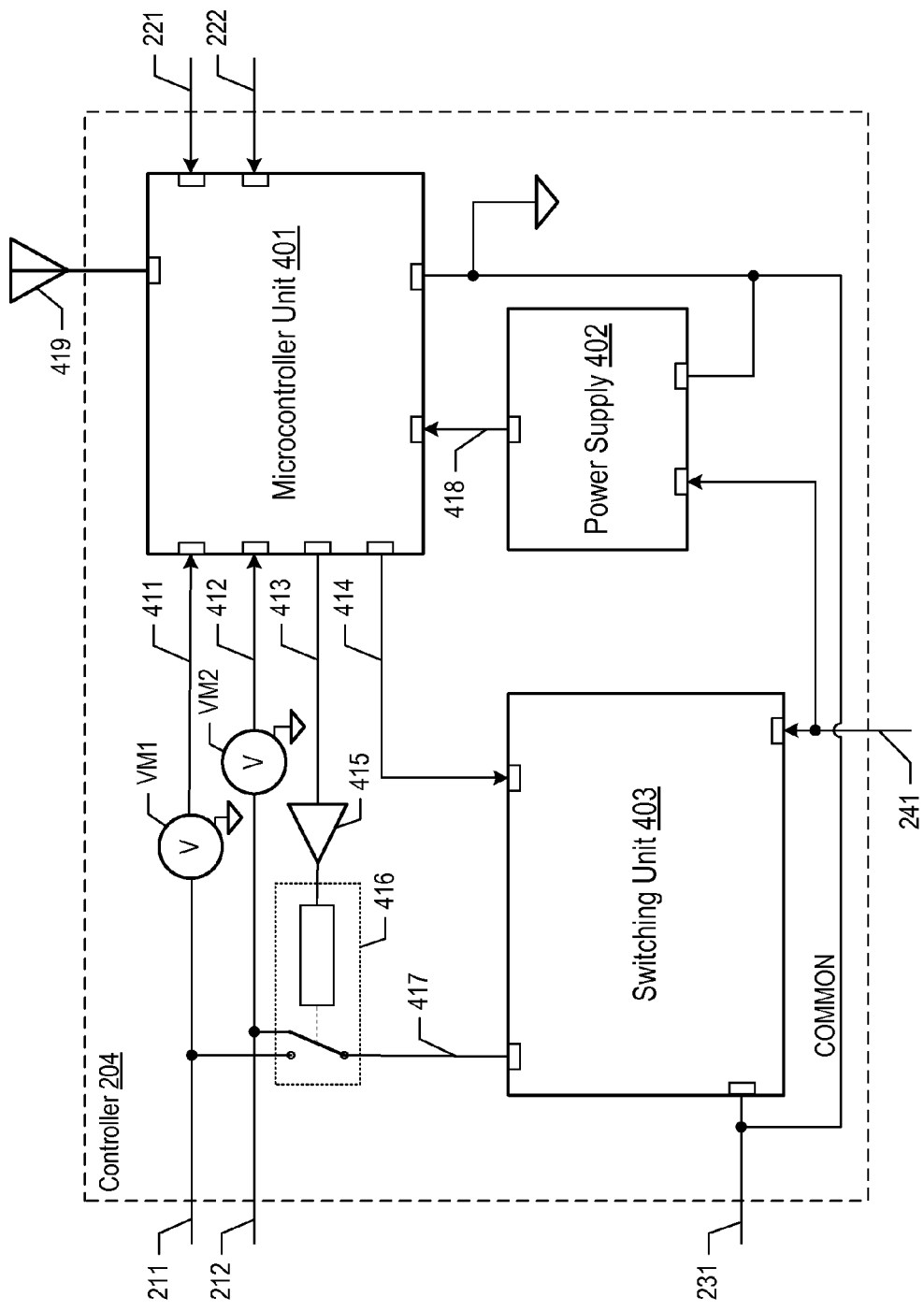
FIG. 4 depicts controller 204 of system 200.

FIG. 4 depicts a schematic diagram of controller 204 in accordance with the illustrative embodiment of the present invention. Controller 204 comprises microcontroller unit 401, power supply 204, and switching unit 403, as well as voltage measurement detectors VM1 and VM2, driver 415, direction relay 416, all of each are interconnected as shown.

Microcontroller unit 401 comprises a programmable microprocessor with program (non-volatile) memory, persistent data (non-volatile) memory, and random access (volatile) memory, along with a communications module. Microcontroller unit (MCU) 401 executes the logic that performs the various procedures as described below and in the accompanying figures. Based on the logic executed, MCU 401 interprets input signals on lines 221 and 222 from respective switch terminals SW1 and SW2 within switch 205, which provides inputs to MCU 401. In one mode, MCU 401 emulates the switching behavior of SW1 and SW2 as if lines 221 and 222 were directly connected to windings W1 and W2, respectively (i.e., driving the windings directly). The SW1 and SW2 terminals enable connecting existing motor controller switches, effectively converting an existing "dumb" motor switch into a "smart/connected" motor controller by introducing controller 204. MCU 401 can sense and execute different set of actions based on how the switches are operated; for example and without limitation, i) a short, single press of a switch can start/stop the motor, and ii) a long (e.g., greater than 5 seconds, etc.) press of a switch or of both switches can initiate the calibration process. The SW1 and SW2 terminals are galvanically isolated via opto-couplers (omitted for clarity purposes).

Also, based on the logic executed MCU 401 interprets input signals on voltage detector lines 411 and 412 accordingly. As described below, a signal on line 411 can be used to determine movement or stoppage of motor 201 in one direction by the voltage, or change in voltage, induced on winding W1 and correspondingly reflected on line 411; similarly, a signal on line 412 can be used to determine movement or stoppage of the motor in the opposite direction by the voltage, or change in voltage, induced on winding W2 and correspondingly reflected on line 412.

Further based on the logic executed, MCU 401 provides output signals on lines 413 and 414 accordingly. MCU 401 provides for communication with mobile station 206 via antenna path 419. Power to MCU 401 is provided via line 418.

Power supply 402 converts AC line voltage (or "mains" power) that is provided at line 241, to a direct-current (DC) voltage suitable for microcontroller unit 401. Supply 402 provides the DC power to MCU 401 via line 418. The neutral line in the AC supply corresponds to line 231. It will be clear to those skilled in the art how to make and use power supply 402.

Switching unit 403 is part of a driver circuit that is configured to drive motor 201, controlling motor 201 in a first direction via line 211 and in a second direction via line 212. Unit 403 is driven by MCU 401 using signals provided via line 414. Furthermore, unit is configured to switch AC power on line 241 on or off, to relay 416 via line 417. Related to this, unit 403 features protection against induced voltage, as described below. Switching unit 403 is described below and in FIG. 9.

Relay 416 is an electromechanical relay that is configured to switch the power signal present on line 417, to either line 211 or 212, based on the direction-switching signal present on line 413 and conditioned, if necessary, by driver 415. In some alternative embodiments of the present invention, relay 416 is a different type of relay than electromechanical.

Voltage measurement detectors VM1 and VM2 detect the voltage level present on lines 211 and lines 212, respectively, in well-known fashion. In particular, when a voltage is induced on winding W1, detector VM1 detects, relative to ground, the voltage induced at winding W1 and provides an indicium of the value to MCU 401 via line 411. Similarly, when a voltage is induced on winding W2, detector VM2 detects, relative to ground, the voltage induced at W2 and provides an indicium of the value to MCU 401 via line 412. For example and without limitation, the detector circuit comprising detectors VM1 and VM2 can be used to detect the upper and lower limits of a motorized window blind, or the extreme positions of a different type of device 203, and can enable the calibration process described below.

Figure 5:
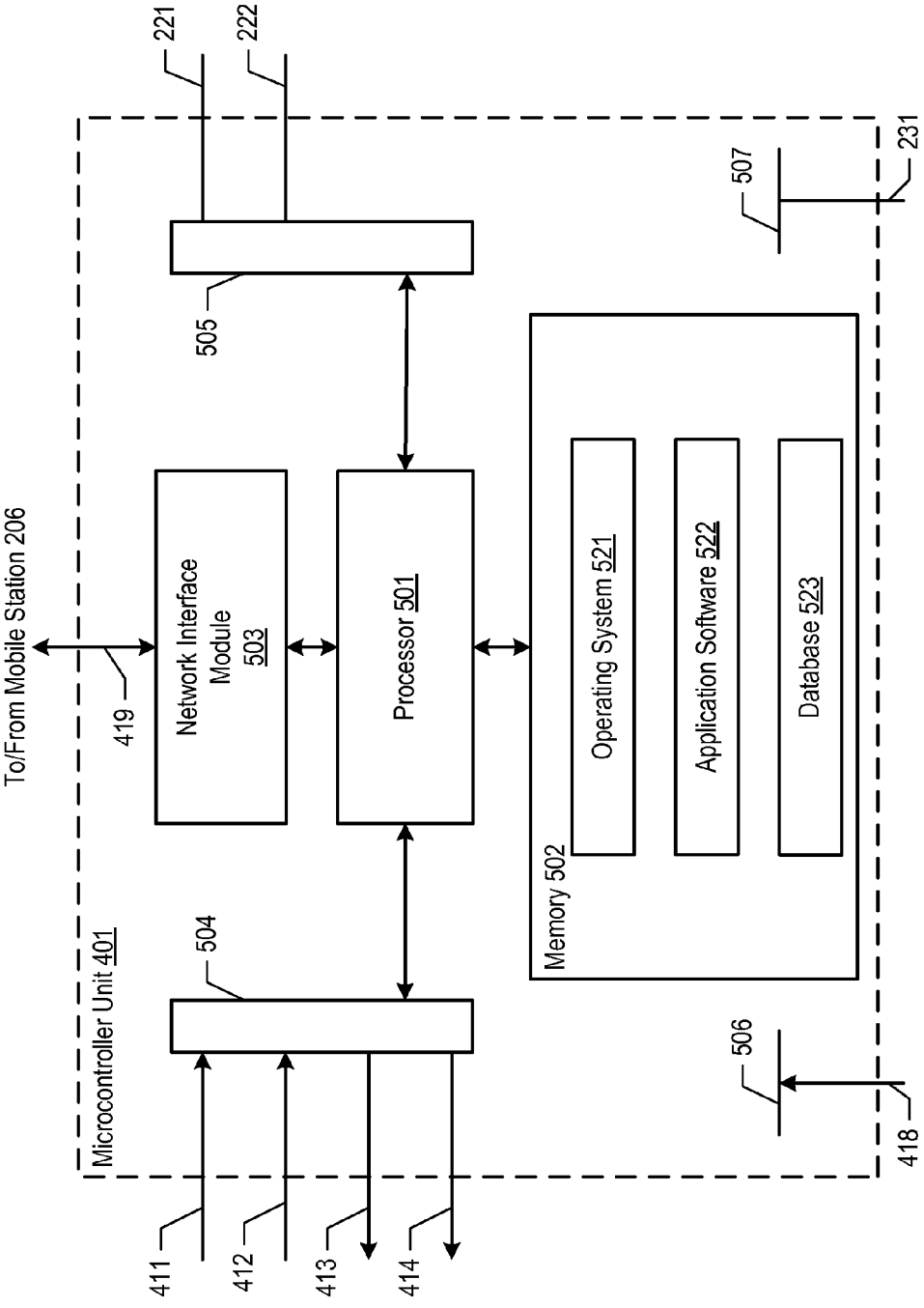
FIG. 5 depicts a block diagram of the salient components of microcontroller unit 401 of controller 204.

FIG. 5 depicts a block diagram of the salient components of microcontroller unit 401 in accordance with the illustrative embodiment of the present invention. In particular, microcontroller unit (MCU) 401 comprises: processor 501, memory 502, network interface module 503, input/output interfaces 504 and 505, power distribution bus 506, and electrical ground 507, which are interconnected as shown.

Processor 501 is a general-purpose microprocessor that is configured to execute operating system 521 and application software 522, and to populate, amend, use, and manage database 523, as described in detail below and in the accompanying figures, including FIGS. 6 and 9-11. In any event, it will be clear to those skilled in the art how to make and use processor 201.

Memory 502 is non-transitory and non-volatile computer storage memory technology that is well known in the art (e.g., flash memory, etc.). Memory 502 is configured to store operating system 521, application software 522, and database 523. The operating system is a collection of software that manages, in well-known fashion, MCU 401's hardware resources and provides common services for computer programs, such as those that constitute the application software. The application software that is executed by processor 501 enables MCU 401 to perform the functions disclosed herein. Database 523 comprises information relating to current position of motorized device 203, and also the calibrated time intervals of motorized device 203's movements in various directions (e.g., up, down, etc.).

It will be clear to those having ordinary skill in the art how to make and use alternative embodiments that comprise more than one memory 502; or comprise subdivided segments of memory 502; or comprise a plurality of memory technologies that collectively store the operating system, application software, and database.

Network interface module 503 comprises a network adapter configured to enable MCU 401 to transmit information to and receive information from a smart home system or a user device, such as mobile station 206, for example and without limitation. Module 503 communicates wirelessly via Bluetooth Low Energy (BLE) in accordance with the illustrative embodiment of a present invention. In some other embodiments of the present invention, network interface module 503 can communicate via one or more different types of wireless network technology standards, in addition to or instead of BLE, such as Z-Wave, ZigBee, Wi-Fi, Bluetooth Classic, or Thread, for example and without limitation. In a multiple-protocol configuration, a first network adapter can support a first standard (e.g., BLE, etc.), a second network adapter can support a second standard (e.g., WiFi, etc.), and so on, for example and without limitation.

As those who are skilled in the art will appreciate after reading this specification, module 503 can comprise one or more of the elements that are depicted in FIG. 5 as being separate from module 503, such as processor 501 and/or memory 502.

In accordance with the illustrative embodiment, MCU 401 uses network interface module 503 in order to telecommunicate wirelessly with external devices. It will be clear to those skilled in the art, however, after reading the present disclosure, how to make use and use various embodiments of the present invention in which MCU 401 communicates via a different type of wireless network (e.g., personal area network, local area network, etc.), or via a wired protocol (e.g., X10, KNX, etc.) over physical media (e.g., cable, wire, etc.) with one or more external devices, either in addition to or instead of the wireless capability provided by module 503. In any event, it will be clear to those skilled in the art, after reading this specification, how to make and use network interface module 503.

Input/output (I/O) interfaces 504 and 505 are I/O devices that provide, in well-known fashion, the various characteristics needed in order to receive signals from and to transmit signals to the various devices with which MCU 401 interacts.

Power distribution system 506 provides power from power supply 402 to the various devices that constitute MCU 401, in well-known fashion. For purposes of clarity, the individual signal lines between bus 506 and their respective devices are not depicted.

Electrical ground system 507 provides an electrical ground for the devices within MCU 401, as needed, in well-known fashion.

Detection of Limits of Motion—

As explained earlier, a motor of a window blind typically comprises two windings, in which one of the windings, when energized, drives the motor in a first direction of rotation and the other winding drives the motor in a second direction. The motor typically has limit switches that cut off power to the motor when the blind reaches its top or bottom position. Most such motors do not have output terminals to expose signals from the internal limit switches; therefore, motorized systems must rely on something else to determine that a motorized device has reached a limit of movement, such as the blind reaching its topmost or bottommost position. In some techniques in the prior art, a controller connected to the motor measures the current being drawn by the rotating motor and determines the moment when the limit switch opens by detecting when the current flow stops. This measurement of current flow requires a relatively expensive sensing circuit.

Figure 6:
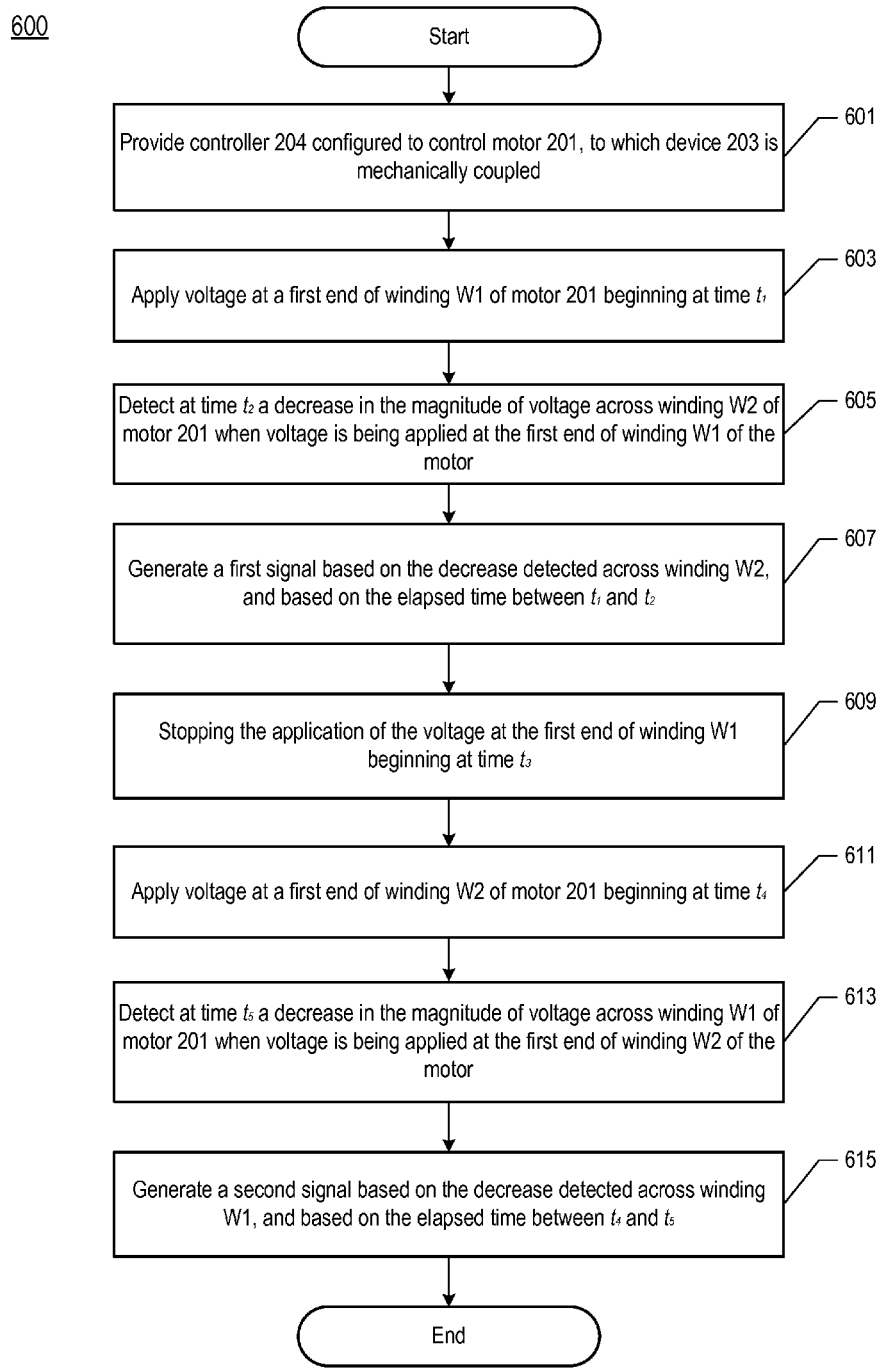
FIG. 6 depicts some salient operations according to the illustrative embodiment of the present invention, in which a first-position limit and a second-position limit are detected.

FIG. 6 depicts some salient operations of method 600 according to the illustrative embodiment of the present invention, in which a first-position limit (e.g., up-position limit) and a second-position limit (e.g., down-position limit) are detected, not as in the prior art by measuring the change in current flow through a primary winding, defined as the winding that is driving motor 201, but by measuring the change in voltage in the corresponding secondary winding of the motor. This is based on the observation that applying power to the primary winding of motor 201 results in movement of the motor, which in turn results in an induction of voltage in the secondary winding. As already discussed, a circuit providing the measurement of voltage is described in the previous figures; in particular, voltage measurement detectors VM1 and VM2 and MCU 401 in FIG. 4 make up the voltage measurement and control circuitry.

In accordance with the illustrative embodiment of the present invention, the actions depicted in FIG. 6 and the accompanying voltage measurement circuitry in some of the other figures are directed at enabling calibration of a motorized device such as window blinds. However, it will be clear to those skilled in the art after, after reading this specification, how to make and use embodiments of the present invention in which the aforementioned actions and circuitry are applied to other types of systems and/or for other purposes than calibration.

In regard to method 600, as well as to the methods depicted in the other flowcharts contained herein, it will be clear to those having ordinary skill in the art, after reading the present disclosure, how to make and use alternative embodiments of the disclosed methods wherein the recited operations, sub-operations, and messages are differently sequenced, grouped, or sub-divided—all within the scope of the present invention. Also, it will be further clear to those skilled in the art, after reading the present disclosure, how to make and use alternative embodiments of the disclosed methods wherein at least some of the described operations, sub-operations, and messages are optional, are omitted, or are performed by other elements and/or systems.

At task 601, motorized system 200 comprising motor 201, motorized device 203, and controller 204 is provided and powered on. In accordance with the illustrative embodiment, motorized device 203 comprises a window blind capable of being moved up and down; however, it will be clear to those skilled in the art, after reading this specification, how to use embodiments of the present invention in which motorized device 203 is something other than a window blind.

At task 603, controller 204 applies a predetermined voltage at the first end of winding W1 of motor 201 beginning at time $t_1$; that is, voltage is provided via terminal 251 connected to line 211, wherein the voltage is relative to terminal 253 connected to neutral line 231. Applying power to winding W1 results in movement of motor 201 in a first direction (e.g., "up"), which in turn results in the induction of voltage in the opposite winding W2. Detector VM2 is capable of detecting the induced voltage in winding W2.

When motor 201 stops rotating in the first direction (i.e., when limit switch LM1 is opened), the secondary induced voltage drops to zero in winding W2. By measuring the secondary voltage drop, controller 204 indirectly senses that the limit switch has been activated. Corresponding to this effect, at task 605, detector VM2 of controller 204 detects at time $t_2$ a decrease in the magnitude of voltage across winding W2 (i.e., across terminals 252 and 253 connected to lines 212 and 231, respectively). Controller 204 can detect this decrease even as it is still applying voltage across winding W1.

At task 607, MCU 401 of controller 204 generates and outputs a first signal (e.g., a message, etc.) based on the decrease detected at task 605. MCU 401 provides a time indication in the first signal based on the elapsed time between $t_1$ and $t_2$. In some embodiments, MCU 401 generates the signal based on the magnitude falling substantially to zero.

In some embodiments, the generating of the first signal is further based on detecting a decrease in magnitude of current across terminals 251 and 253, which is caused by limit switch LM1 shutting off power to winding W1.

At task 609, controller 204 stops the application of the voltage at the first end of winding W1 beginning at time $t_3$ based on the detecting of the decrease in magnitude of voltage across terminals 252 and 253. In some embodiments, $t_3$ is based on the first signal.

At task 611, controller 204 applies a predetermined voltage at the first end of winding W2 of motor 201 beginning at time $t_4$; that is, voltage is provided via terminal 252 connected to line 212, wherein the voltage is relative to terminal 253 connected to neutral line 231. Applying power to winding W2 results in movement of motor 201 in a second direction (e.g., "down", opposite to the first direction, etc.), which in turn results in the induction of voltage in the opposite winding W1. Detector VM1 is capable of detecting the induced voltage in winding W1.

When motor 201 stops rotating in the second direction (i.e., when limit switch LM2 is opened), the secondary induced voltage drops to zero in winding W1. By measuring the secondary voltage drop, controller 204 can indirectly sense that the limit switch has been activated. Corresponding to this effect, at task 613, detector VM1 of controller 204 detects at time $t_5$ a decrease in the magnitude of voltage across winding W1 (i.e., across terminals 251 and 253 connected to lines 211 and 231, respectively). Controller 204 can detect this decrease even as it is still applying voltage across winding W2.

At task 615, MCU 401 of controller 204 generates and outputs a second signal (e.g., a message, etc.) based on the decrease detected at task 613. MCU 401 provides a time indication in the second signal based on the elapsed time between $t_4$ and $t_5$. In some embodiments, MCU 401 generates the signal based on the magnitude falling substantially to zero.

In some embodiments, the generating of the second signal is further based on detecting a decrease in magnitude of current across terminals 252 and 253, which is caused by limit switch LM2 shutting off power to winding W2.

Generally speaking, by measuring the drop in the induced voltage of the secondary winding, controller 204 is able to sense that motor 201 has stopped, which is caused by a limit switch having been activated. Measuring voltage is easier and requires simpler and less expensive circuitry compared to measuring the current flow through the primary winding in order to determine the power draw on that primary winding driving the motor.

In some embodiments of the present invention, controller 201 measures the induced voltage of the secondary winding and measures the applied voltage in the primary winding, and correlates the two measurements with each other. In doing so, controller 204 is able to sense whether motor 201 has stopped by itself, which can be caused by a limit switch having been activated, or has stopped as a result of an intentional action, such as by a user pressing a switch to stop the motor. If the applied voltage is still present, for example, then the motor might have stopped by itself, but if the applied voltage is no longer present, then the motor might have been stopped intentionally.

Protection of the Driver Circuit—

Figure 7:
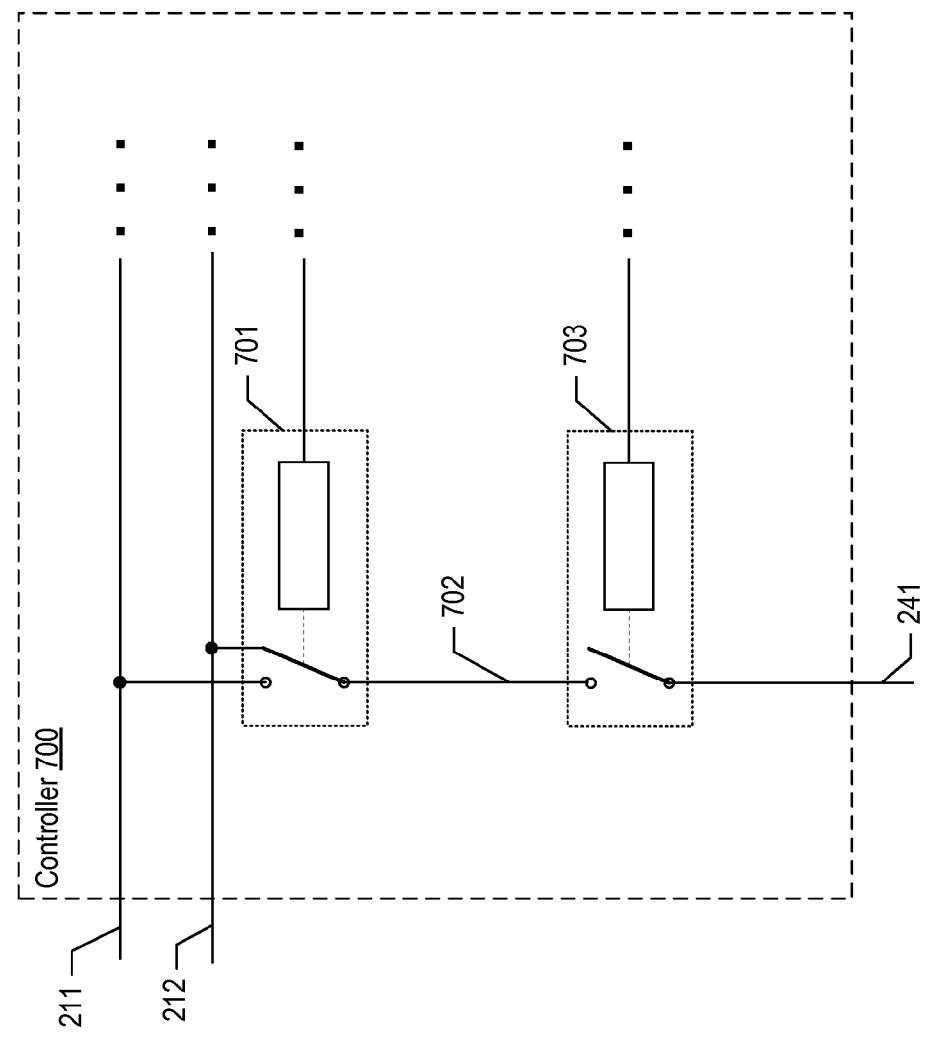
FIG. 7 depicts controller 700.

FIG. 7 depicts certain features of an alternative configuration of controller 204, which alternative configuration is labeled as controller 700. As with controller 204, controller 700 is configured to control motor 201 via lines 211 and 212 and is configured to provide AC power provided via line 241 to a particular motor winding via a direction relay, in this configuration labeled as relay 701. In controller 700, relay 701 is provided with power via line 702 connected to power relay 703. Relay 703 is configured to switch the AC power that is provided to the selected winding either on or off.

As discussed earlier, motor 201 comprises built-in limit switches LM1 and LM2. They open the circuit, effectively cutting off power to their respective winding, whenever the limit positions are reached (e.g., up/down, left/right, etc.), depending on the setup of the device driven by the motor.

Figure 8A:
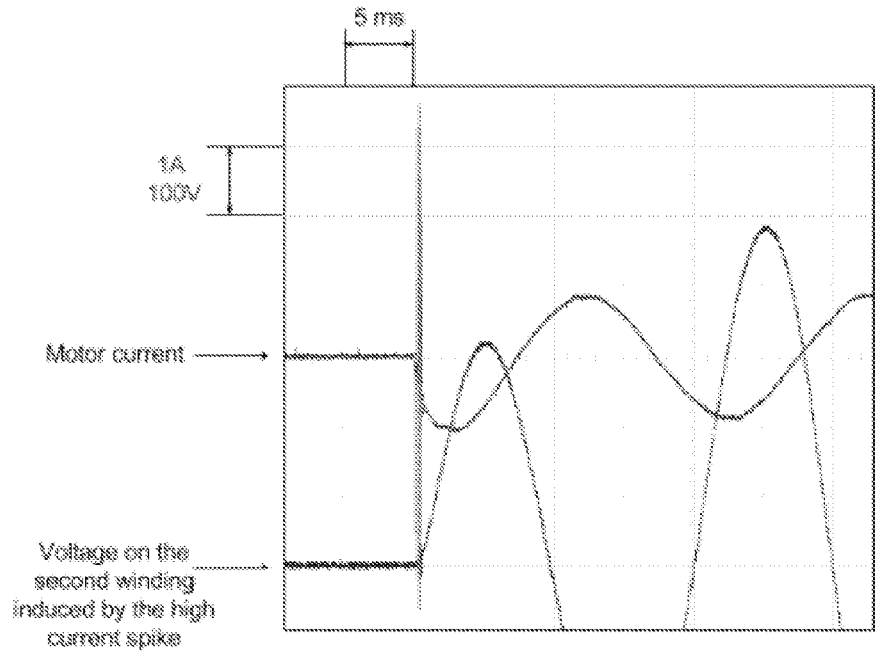
FIGS. 8A and 8B depict conditions that can occur when powering motor 201 on and off, respectively.

Powering on the motor is associated with two effects: i) the inertia of rotor RO, and ii) the induction of the winding. When powering on motor 201, the inertia of rotor RO results in a current peak that exceeds the nominal current by a factor of four to ten times. The current oscillates rapidly because of the induction of the winding, as depicted in FIG. 8A, which is based on a screenshot from an oscilloscope. The figure shows current in the first winding and induced voltage in the second winding.

Figure 8B:
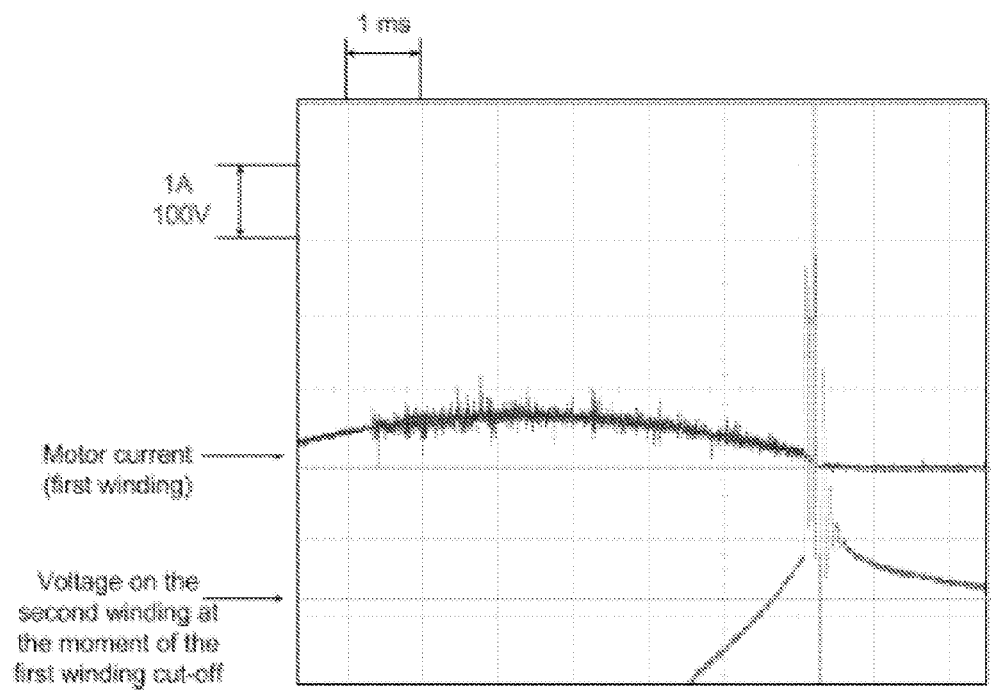

When motor 201 reaches the upper or lower limit position, the limit switch cuts off the power to the active circuit. At that moment there is an accumulated energy in the motor and winding. This energy generates (induces) an overvoltage condition in both windings W1 and W2. Overvoltage generated in the second winding makes it especially difficult to use two TRIACs (i.e., one on, the other off) in place of direction switching relay 701. The phenomenon is depicted in FIG. 8B, which is based on a screenshot from an oscilloscope. On a 230 VAC motor, induced voltage has been observed as reaching 1500V. As shown in the figure, cutting off power to the first winding results in a high voltage spike in the second winding. Notably, the "hairy" part of waveform is caused by the vibrating switch contacts that are opening.

Figure 9:
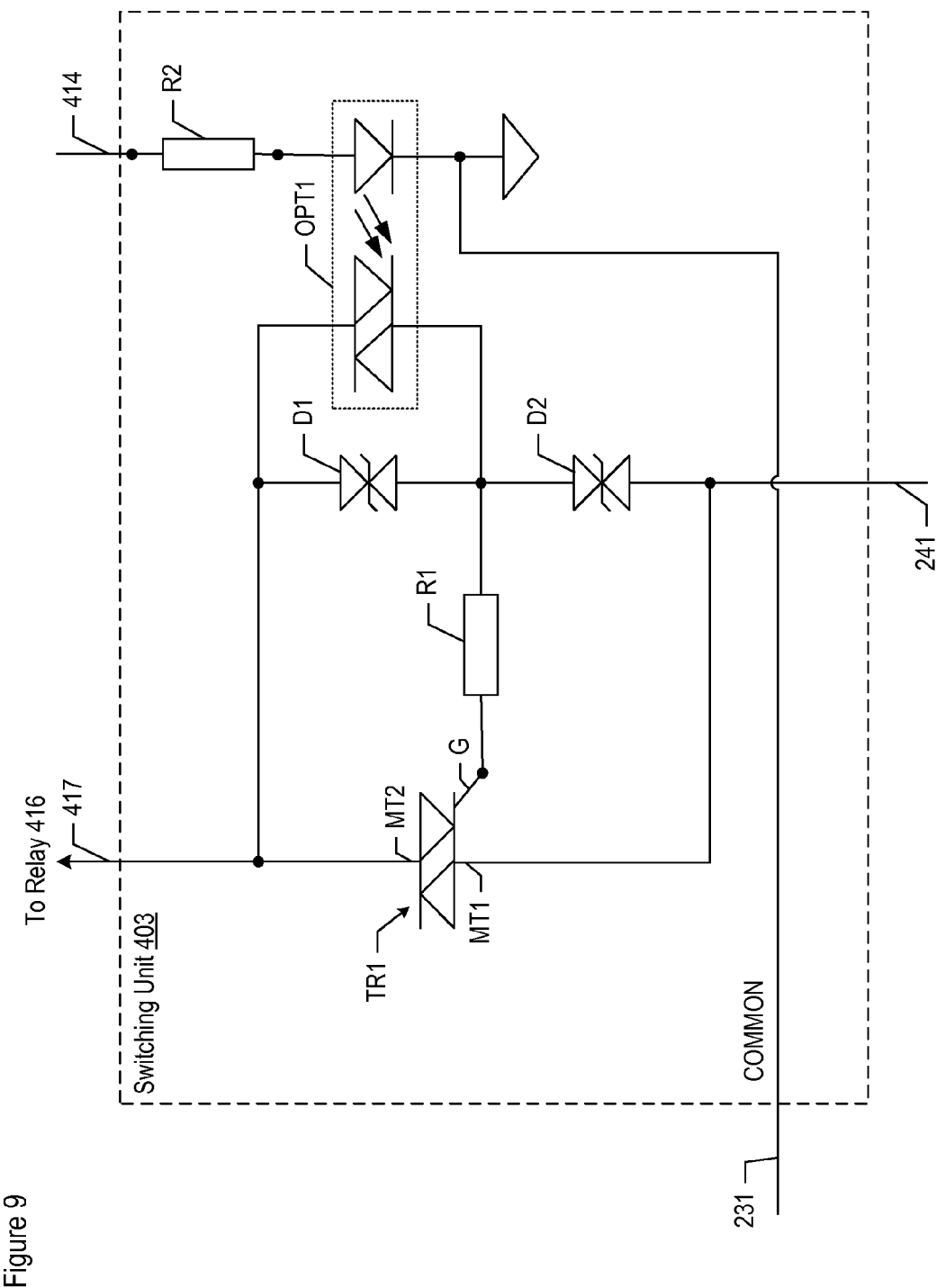
FIG. 9 depicts a schematic diagram of the salient components of switching unit 403 of controller 204, in accordance with the illustrative embodiment of the present invention.

FIG. 9 depicts a schematic diagram of the salient components of switching unit 403, which is intended to address the aforementioned problems, in accordance with the illustrative embodiment of the present invention. Switching unit 403 of controller 204 supports a cascaded relay-TRIAC configuration, wherein TRIAC stands for "triode for alternating current," in which relay 416 is used to select the direction of motor 201, as described above, and TRIAC TR1 is used to switch on or off the AC power provided to relay 416.

TRIAC TR1 as depicted comprises an MT1 terminal (also referred to as a "T1" terminal or an "A1" terminal), an MT2 terminal (also referred to as a "T2" terminal or an "A2" terminal), and a gate, as are known in the art. In some alternative embodiments, TR1 is a different type of thyristor or electronic switching device than a TRIAC, which can conduct current in either direction when it is triggered (i.e., turned on). In regard to configuration, TR1 in some alternative embodiments is flipped in relation to what is depicted in FIG. 9, such that MT2 is where MT1 is depicted, and vice-versa.

Transient-voltage-suppression, or "TVS", diode D1, as is known in the art, has i) a first terminal electrically coupled to the MT2 terminal of TR1 and ii) a second terminal. In some embodiments of the present invention, components that are "electrically coupled" are specifically directly and electrically connected. An example of a TVS diode is a Transil™ diode.

TVS diode D2 has i) a first terminal electrically coupled to the second terminal of diode D1 and ii) a second terminal electrically coupled to the MT1 terminal of TR1. In some alternative embodiments, a different type of diode or electronic component used to protect electronics from voltage spikes on connected wires can be used in place of TVS diode D1 and/or D2.

Resistor R1 has i) a first terminal electrically coupled to the second terminal of diode D1 and the first terminal of the diode D2 and ii) a second terminal electrically coupled to the gate of TR1. The ohmic resistance of resistor R1 is selected such that TR1 conducts electrical current between the MT1 and MT2 terminals if the predetermined voltage across the diode D2 is exceeded. In some embodiments of the present invention, resistor R1 has a value of 1000 ohms.

Opto-triac OPT1 has i) a light-emitting diode (LED) and ii) a TRIAC that has a) a first terminal electrically coupled to the first terminal of the diode D1, b) a second terminal electrically coupled to the second terminal of diode D1 and the first terminal of the diode D2, and c) a gate configured to cause electrical current to be conducted between the first and second terminals of the TRIAC based on light emitted by the LED. Microcontroller unit 401 is electrically coupled to the LED, in this case through resistor R2, wherein the microcontroller is configured to switch the OPT1 TRIAC via the LED.

AC voltage source 202 is electrically coupled to the MT1 terminal of TR1, and relay 416 is electrically coupled to the MT2 terminal of TR1.

A theoretical alternative to the cascaded relay-TRIAC configuration of switching unit 403 would be to use two TRIACs, one on each winding. This two-TRIAC approach, however, is problematic because of the induced voltage on the passive winding that occurs when motor 201 stops, such as when a limit switch opens the active winding (i.e., the winding powering the motor). The induced voltage can pierce the TRIAC connected to the passive winding. This TRIAC cannot be protected with TVS diodes D1 and D2, as this will lead to a closing of the seconding winding circuit, causing motor 201 to immediately start to rotate in the opposite direction because the secondary winding will be powered.

In regard to operation, motor 201 is started by MCU 401 selecting a position of relay 416 according to the intended rotation direction via the appropriate signal being provided on line 413. After the relay contacts are stable (typically after about 20 milliseconds), voltage for driving opto-triac OPT1 is applied at line 414. Opto-triac OPT1 starts conducting current after the AC voltage crosses zero and causes TRIAC TR1 to start conducting current. As a result, the power is applied to the motor winding without generating any sparks on relay contacts. In some embodiments of the present invention, the inrush current that TRIAC TR1 can sustain must be enough to accommodate the inrush current of the stationary motor winding.

Motor 201 is now rotating at this point, and there are two ways to stop it:
  i. turning off the voltage driving opto-triac OPT1 that is being applied at line 414, and
  ii. activating a limit switch by the motor reaching the corresponding upper or lower limit position.

In the first case, TRIAC TR1 stops conducting current when the line AC voltage (i.e., between MT1 and MT2) reaches zero. No overvoltage condition occurs in this case.

Figure 10A:
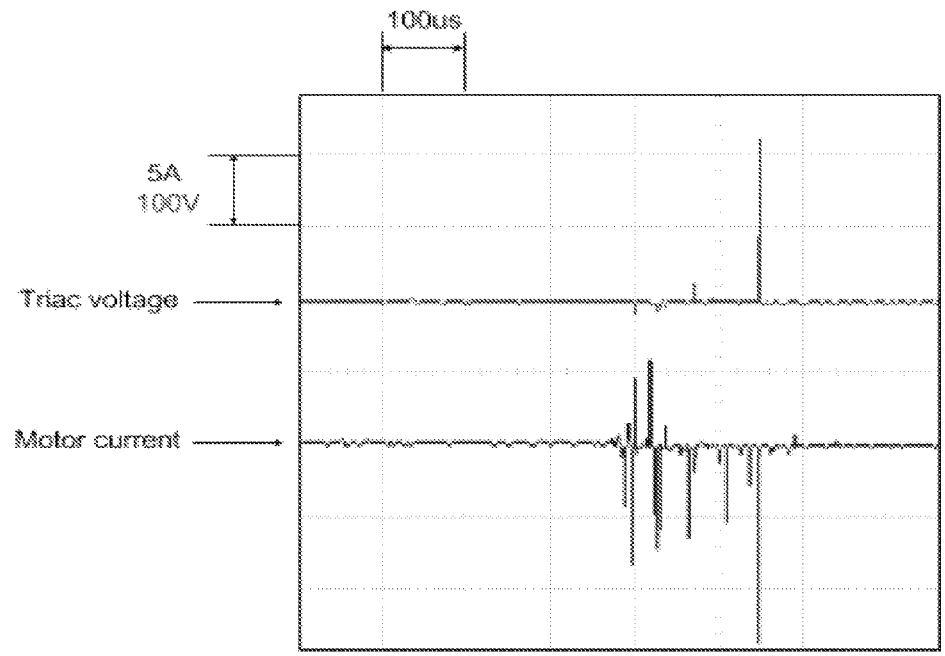
FIGS. 10A and 10B depict conditions that can occur when a limit switch cuts off a winding.

In the second case, the limit switch cuts off the circuit asynchronously to the line AC. When the contacts of the limit switch are opening, there are many high frequency, high voltage oscillations in both windings when no suppression circuit is present, as depicted in FIG. 10A. In this case, the voltage can reach upwards of 1500V. The oscillating high voltage forms an electric arc between the opening contacts of the limit switch and hits TRIAC TR1. The TRIAC is too slow to suppress the high voltage. The current conducted by the TRIAC can rise at a rate of several amps per microsecond (uS). If the high voltage oscillations rise at a higher rate than about 100V/uS, which they can do, the TRIAC will not conduct the resulting current fast enough. This would lead to piercing the TRIAC.

Figure 10B:
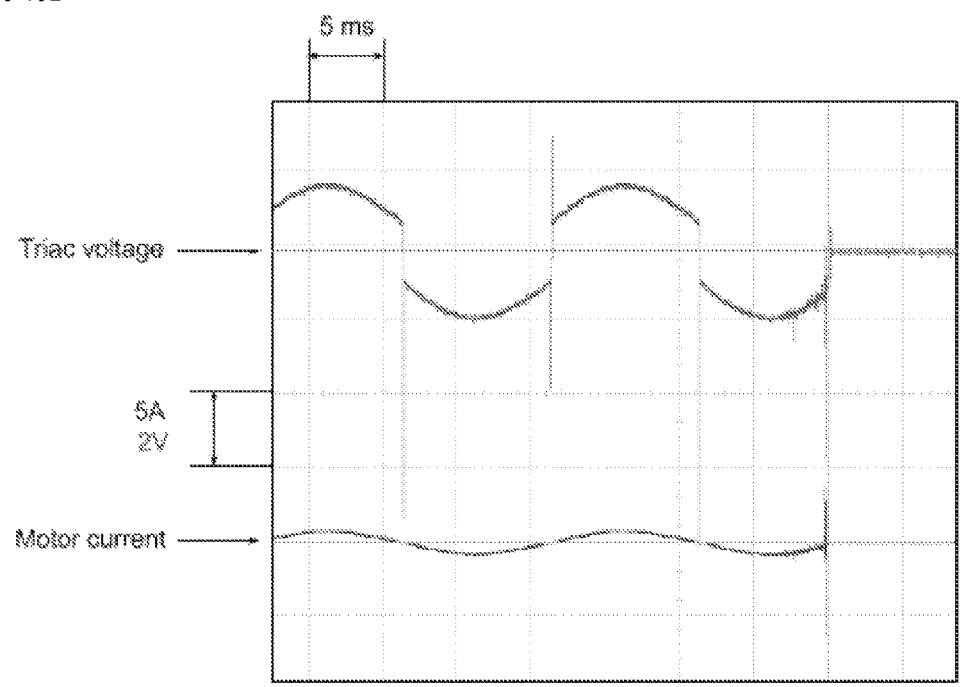

To prevent the TRIAC from being pierced, the two TVS diodes, which conduct current much faster than a TRIAC can, serve to suppress the fast-rising, high voltage. In the illustrative embodiment, when the voltage across MT1 and MT2 terminals exceeds 420V, TVS diodes D1 and D2 start conducting the current, thereby preventing any further rise of the voltage. The diodes, however, cannot suppress the entire energy accumulated in the motor—their junctions would evaporate if called upon to do so. To prevent this, a second-stage circuit (sometimes referred to as a "crowbar") is implemented in switching unit 403, in which resistor R1 powers TRIAC TR1's gate, the TRIAC starts conducting the current and takes over the load from diodes D1 and D2, protecting the diodes from overheating. FIG. 10B reflects the behavior of switching unit 403 in providing the protection described above. In this case, the voltage does not exceed 10V.

Consistent with its configuration and operation as described above, controller 204, comprising direction-switching relay 416 and switching unit 403, is intended to provide at least one or more of the following features:
  i. full control of bi-directional motors up to at least 500 W/230 VAC.
  ii. protection against powering both windings W1 and W2 simultaneously.
  iii. electronic, spark-free powering on and off of motor 201.
  iv. dual-phase suppression of overvoltage when motor 201 is stopped by a limit switch.
  v. reduced size of the circuit, in that there is only a single mechanical relay 416 rather than two mechanical relays.
  vi. enhanced durability.
  vii. no need for a traditional RC overvoltage suppressor.

Automatic Calibration—

Figure 11:
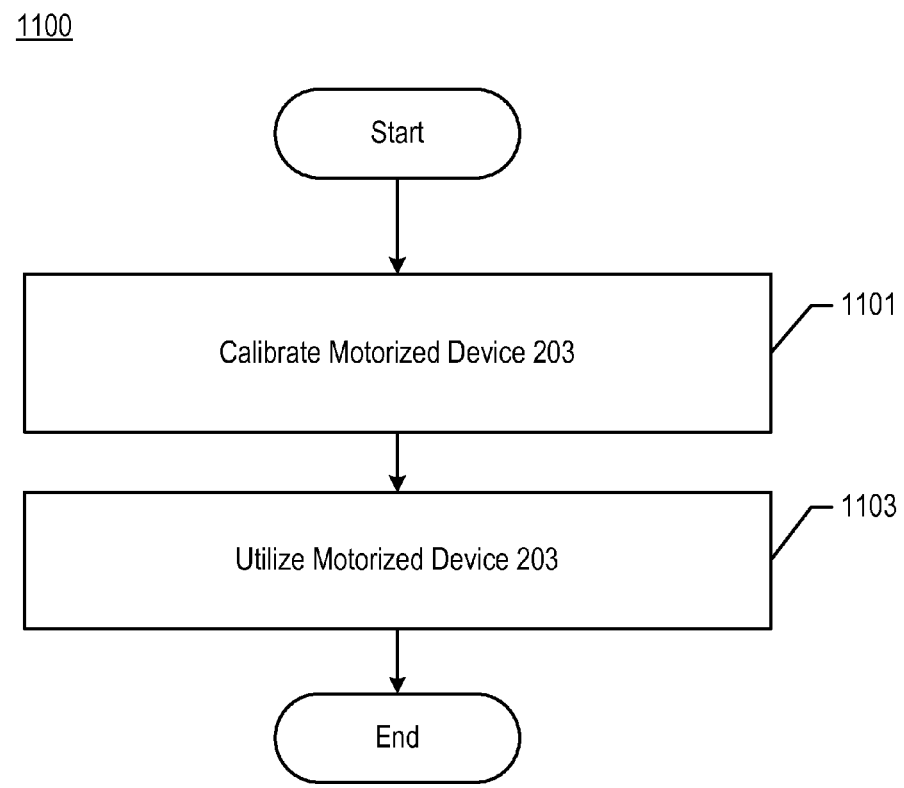
FIG. 11 depicts some salient operations of method 1100 according to the illustrative embodiment of the present invention, in which motorized device 203 is calibrated and utilized.

FIG. 11 depicts some salient operations of method 1100 according to the illustrative embodiment of the present invention, in which motorized device 203 is calibrated and utilized. A smartphone application executed by mobile station 206 is configured to communicate with the controller 204, either directly with the controller or indirectly through an intermediary smart-home-control system. Having such an application interacting with controller 204 enables a guided, automatic calibration process.

At task 1101, controller 204 calibrates device 203 in accordance with the method described below and in FIG. 12. Calibration refers to ensuring that the motorized device is at the position where the user believes it to be.

At task 1103, controller 204 utilizes device 203 in accordance with the method described below and in FIG. 13. Utilization refers to routine usage of the motorized device by the user.

As those who are skilled in the art will appreciate after reading this specification, either or both of tasks 1101 and 1103 can be repeated in any combination of repetitions.

Figure 12:
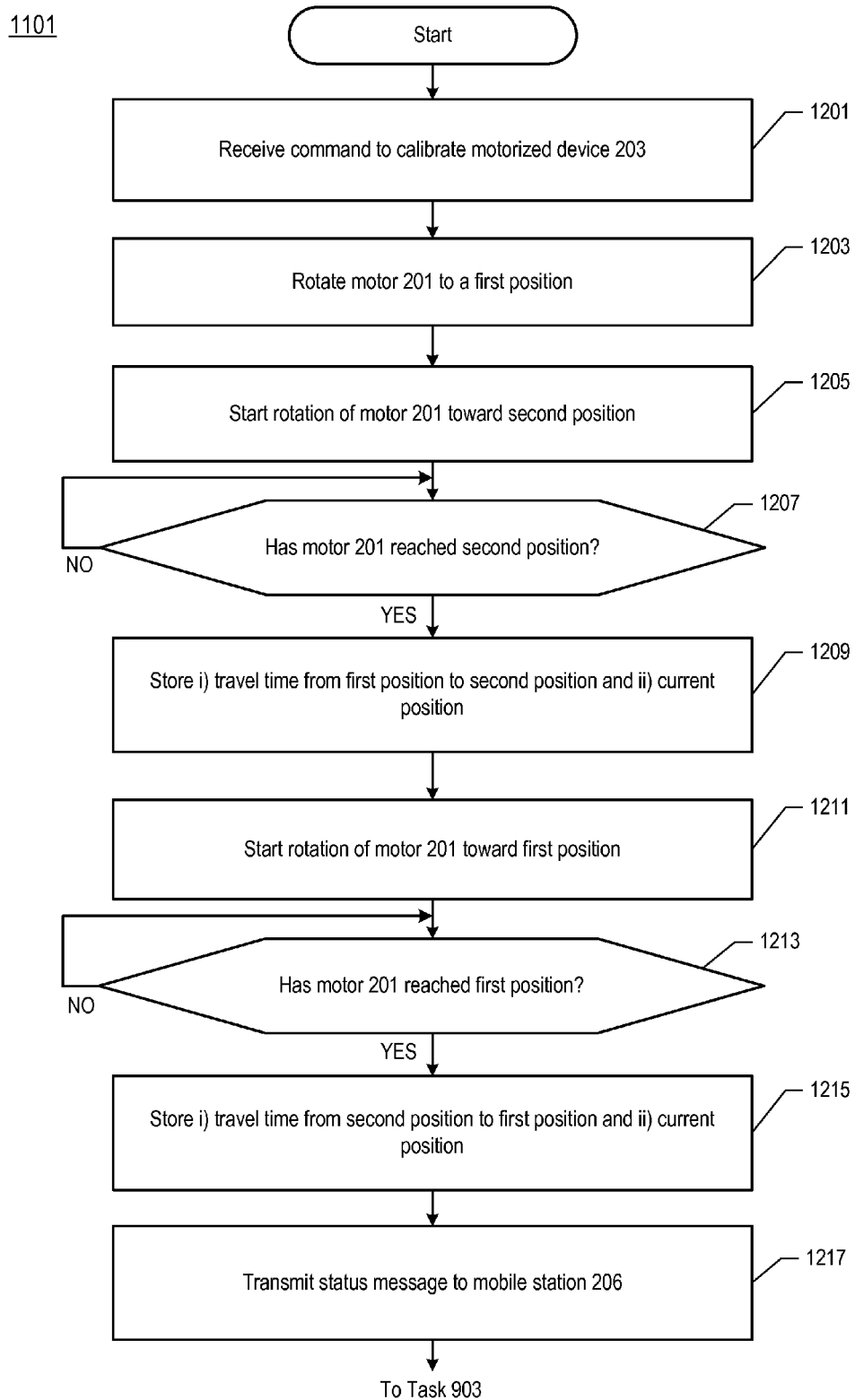
FIG. 12 depicts the salient sub-operations of task 1101 of method 1100.

FIG. 12 depicts the salient sub-operations of task 1101. At task 1201, controller 204 receives a command from mobile station 206 to calibrate motorized device 203, which is mechanically coupled to shaft SH of motor 201.

Based on receiving the command, at task 1203 controller 204 actuates motor 201 in order to move motorized device 203 to a first position (e.g., window blinds in the full down position, etc.).

Based on receiving the command, at task 1205 controller 204 actuates motor 201 by providing voltage at a first winding of the motor. The actuating is such that the shaft rotates in a first direction moving motorized device 203 from the first position toward a second position (e.g., window blinds in the full up position, etc.).

At task 1207, controller 204 detects whether device 203 has reached the second position. Only if it has does controller 204 proceed to task 1209. In some embodiments of the present invention, controller 204 detects that the device 203 has reached the second position by measuring voltage on the second winding, as described above and in FIG. 6.

At task 1209, controller 204 determines and stores the elapsed time in moving from the first position to the second position. In addition, controller 204 stores the second position as the current position of device 203.

At task 1211, controller 204 actuates motor 201 by providing voltage at a second winding of the motor. The actuating is such that the shaft rotates in a second direction moving motorized device 203 from the second position (e.g., up position, etc.) toward the first position (e.g., down position, etc.).

At task 1213, controller 204 detects whether device 203 has reached the first position. Only if it has does controller 204 proceed to task 1215. In some embodiments of the present invention, controller 204 detects that the device 203 has reached the first position by measuring voltage on the first winding, as described above and in FIG. 6.

At task 1215, controller 204 determines and stores the elapsed time in moving from the second position to the first position. In addition, controller 204 stores the first position as the current position of device 203.

At task 1217, controller 204 transmits a message based on device 203 having reached the first position as detected at task 1213. In some embodiments of the present invention, controller 204 transmits one or more additional status messages (e.g., when device 203 was brought to the first position initially at task 1203, when device 203 reached the second position as detected at task 1207, etc.).

Control of execution then proceeds to task 1103.

Figure 13:
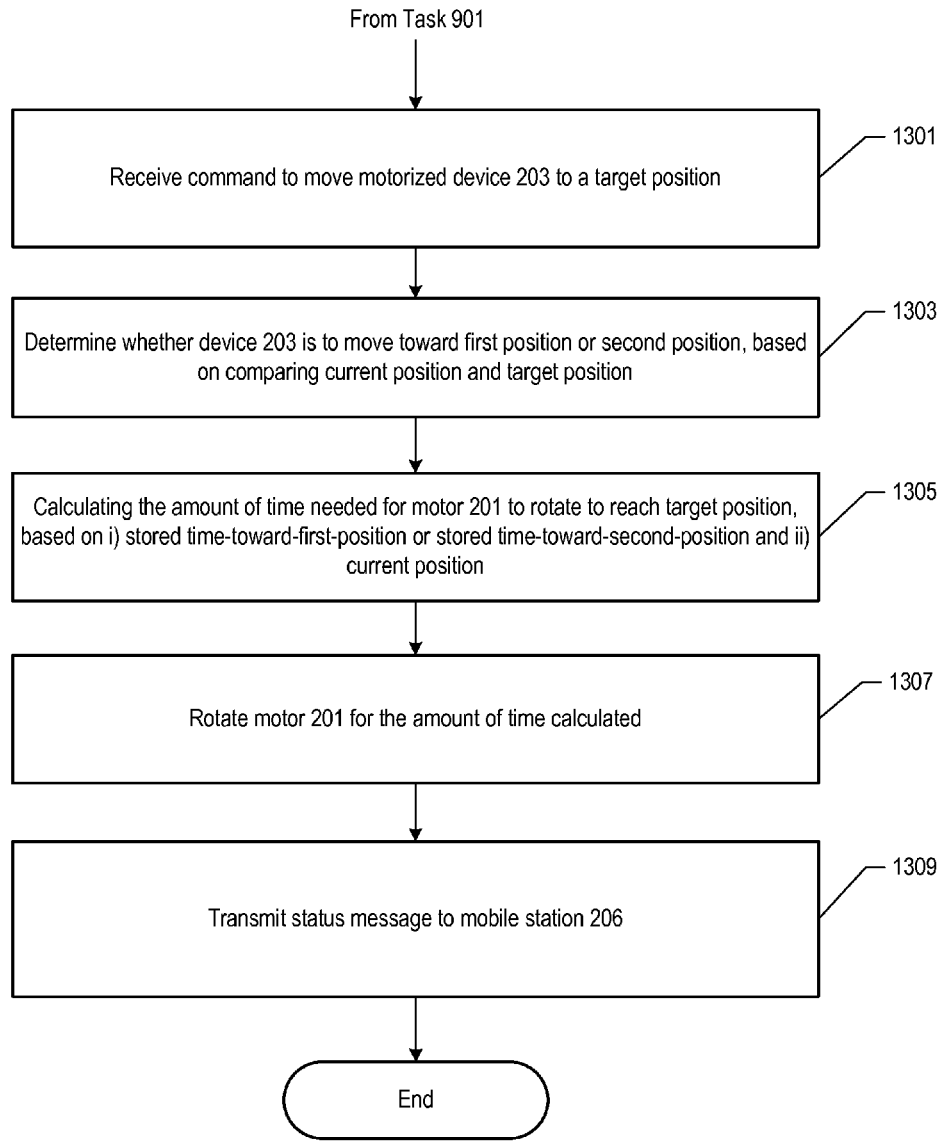
FIG. 13 depicts the salient sub-operations of task 1103 of method 1100.

FIG. 13 depicts the salient sub-operations of task 1103. At task 1301, controller 204 receives a command to move device 203 to a target position (e.g., down from the top by 60%, etc.).

Based on receiving the command at task 1301, at task 1303 controller 204 determines whether device 203 is to move toward the first position or the second position, based on comparing the stored current position with the target position that is either received or derived from the received command.

At task 1305, controller 204 calculates the amount of time needed for device 203 to move to the target position, based on a selection of i) the stored elapsed-time-toward-first-position of ii) the stored elapsed-time-toward-second-position, wherein the selection is based on the required direction of movement that was determined at task 1303. The amount of time is also based on the current position.

At task 1307, controller 204 actuates motor 201 by providing voltage at a particular winding of the motor. The winding is selected based on the required direction of movement and is energized based on the amount of time calculated at task 1305 to get to the target position.

At task 1309, controller 204 transmits a message based on device 203 having reached the target position. In some embodiments of the present invention, controller 204 transmits one or more additional status messages (e.g., a progress indication, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A control system comprising:
    a first terminal of a controller, the first terminal being electrically connectable to a first end of a first winding of a motor having a shaft, wherein voltage being applied via the first terminal to the first end of the first winding in relation to a second end of the first winding results in rotation of the shaft in a first rotation direction, thereby resulting in voltage being induced in a second winding of the motor;
    a second terminal of the controller, the second terminal being electrically connectable to a first end of the second winding of the motor, wherein voltage being applied via the second terminal to the first end of the second winding in relation to a second end of the second winding results in rotation of the shaft in a second rotation direction, thereby resulting in voltage being induced in the first winding of the motor;
    a third terminal of the controller, the third terminal being electrically connectable to the second end of the first winding and the second end of the second winding;
    a first voltage measurement detector of the controller, the first voltage measurement detector being configured to measure, across the second and third terminals, the voltage being induced across the second winding when voltage is being applied via the first terminal; and
    a processor of the controller, the processor being configured to output a first signal based on the first voltage measurement detector measuring a decrease, across the second and third terminals, of the voltage being induced across the second winding when the voltage is being applied via the first terminal, wherein the first signal signifies stoppage of the motor in the first rotation direction.

2. The control system of claim 1 further comprising a second voltage measurement detector of the controller, the second voltage measurement detector being configured to measure, across the first and third terminals, the voltage being induced across the first winding when voltage is being applied via the second terminal,
    wherein the processor is further configured to generate a second signal based on the second voltage measurement detector measuring a decrease, across the first and third terminals, of the voltage being induced across the first winding when the voltage is being applied via the second terminal, wherein the second signal signifies stoppage of the motor in the second rotation direction.

3. The control system of claim 1 further comprising the motor, wherein the first end of the first winding, the first end of the second winding, and the second ends of both the first and second windings are electrically connected to the first, second, and third terminals, respectively.

4. The control system of claim 3 further comprising a device to which the motor is mechanically coupled such that rotation of the shaft in the first rotation direction results in a first movement of the device and rotation of shaft in the second rotation direction results in a second movement of the device.

5. The control system of claim 4 wherein the device is a window blind, wherein the first movement corresponds to an opening of the window blind, and wherein the second movement corresponds to a closing of the window blind.

6. The control system of claim 1 wherein the processor is further configured to generate the first signal based on the first voltage measurement detector measuring the magnitude of voltage across the second and third terminals decreasing to substantially zero.

7. The control system of claim 1 wherein the processor is further configured to provide voltage at the first terminal beginning at a first time $t_1$, wherein the generating of the first signal is further based on the time that has elapsed between $t_1$ and when the measuring of the decrease across the second and third terminals occurs, at a second time $t_2$.

8. The control system of claim 7 wherein time $t_1$ corresponds to when the motor is at a first limit of motion and time $t_2$ corresponds to when the motor is at a second limit of motion.

9. The control system of claim 1 wherein the processor is further configured to stop providing voltage at the first terminal at a third time $t_3$ based on the measuring of the decrease in magnitude of voltage across the second and third terminals.

10. The control system of claim 1 wherein the processor is further configured to generate the first signal based on a detecting of a decrease in magnitude of current across the first and third terminals when voltage is being applied at the first end of the first winding.

11. The control system of claim 8 wherein the first limit of motion is established based on having previously detected when a decrease across the first and third terminals occurs.

12. A method for controlling a motor by a controller, the motor having i) a shaft, ii) a first winding, and iii) a second winding, the controller having i) a first terminal that is electrically connected to a first end of the first winding, ii) a second terminal that is electrically connected to a first end of the second winding, and iii) a third terminal that is electrically connected to a) a second end of the first winding and b) a second end of the second winding, the method comprising:
applying, by the controller, predetermined voltage via the first terminal to the first end of the first winding in relation to the second end of the first winding such that the motor shaft rotates in a first rotation direction, thereby resulting in voltage being induced in the second winding;
detecting, by the controller, a decrease, across the second and third terminals, of the voltage being induced across the second winding when the predetermined voltage is being applied via the first terminal; and
generating, by the controller, a first signal based on the decrease detected across the second and third terminals, wherein the first signal signifies stoppage of the motor in the first rotation direction.

13. The method of claim 12, further comprising:
applying, by the controller, predetermined voltage via the second terminal to the first end of the second winding in relation to the second end of the second winding such that the motor shaft rotates in a second rotation direction, thereby resulting in voltage being induced in the first winding;
detecting, by the controller, a decrease, across the first and third terminals, of the voltage being induced across the first winding when the predetermined voltage is being applied via the second terminal; and
generating, by the controller, a second signal based on the decrease detected across the first and third terminals, wherein the second signal signifies stoppage of the motor in the second rotation direction.

14. The method of claim 12 wherein the generating of the first signal is further based on the magnitude of voltage across the second and third terminals decreasing to substantially zero.

15. The method of claim 12 wherein the applying of the voltage at the first end of the first winding begins at a first time $t_1$, wherein the generating of the first signal is further based on the time that has elapsed between $t_1$ and when the detecting of the decrease across the second and third terminals occurs, at a second time $t_2$.

16. The method of claim 15 wherein time $t_1$ corresponds to when the motor is at a first limit of motion and time $t_2$ corresponds to when the motor is at a second limit of motion.

17. The method of claim 12 further comprising stopping, by the controller, application of the voltage at the first end of the first winding at a third time $t_3$ based on the detecting of the decrease in magnitude of voltage across the second and third terminals.

18. The method of claim 12 wherein the generating of the first signal is further based on detecting a decrease in magnitude of current across the first and third terminals when the voltage is being applied at the first end of the first winding.

19. The method of claim 16 wherein the first limit of motion is established based on having previously detected when a decrease across the first and third terminals occurs.

* * * * *